(12) United States Patent
Viaud

(10) Patent No.: US 7,340,996 B1
(45) Date of Patent: Mar. 11, 2008

(54) BALER WITH MOISTURE SENSING ARRANGEMENT

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/581,512

(22) Filed: Oct. 16, 2006

(30) Foreign Application Priority Data

Dec. 10, 2005  (DE) .................. 10 2005 059 172

(51) Int. Cl.
*B30B 5/04* (2006.01)
(52) U.S. Cl. ..................... 100/88; 100/87; 100/99; 56/341
(58) Field of Classification Search ............... 100/87, 100/88, 89, 99; 56/341, 344
See application file for complete search history.

(56) References Cited

U.S. PATENT DOCUMENTS 4,916,888 A  4/1990 Sheehan et al.
6,378,276 B1 *  4/2002 Dorge et al. ................. 53/502

FOREIGN PATENT DOCUMENTS

| DE | 199 34 881 | 1/2001 |
|----|------------|--------|
| DE | 102 04 941 | 8/2003 |
| EP | 1 535 506  | 6/2005 |

OTHER PUBLICATIONS

European Search Report, Mar. 6, 2007, 4 Pages.

* cited by examiner

*Primary Examiner*—Jimmy T. Nguyen

(57) ABSTRACT

A baler includes a baling chamber provided with two walls located opposite each other, and at least one sensor for the detection of the moisture content of a bale located between the two walls being mounted to one of the walls and having sensing area commensurate with that of the entire wall, with the sensor interacting with a contacting surface of the bale and being coupled to a bale moisture evaluation arrangement.

6 Claims, 2 Drawing Sheets

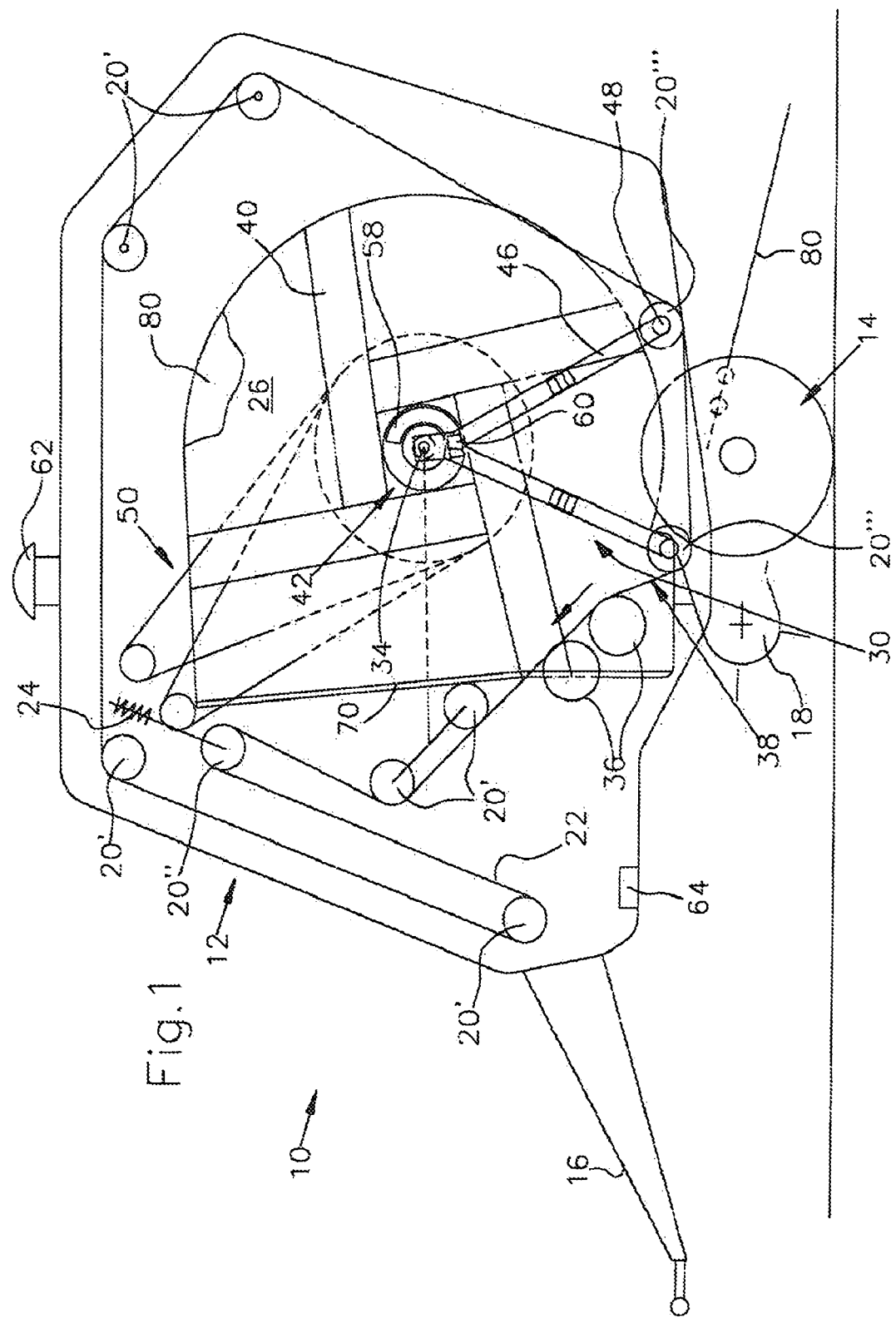

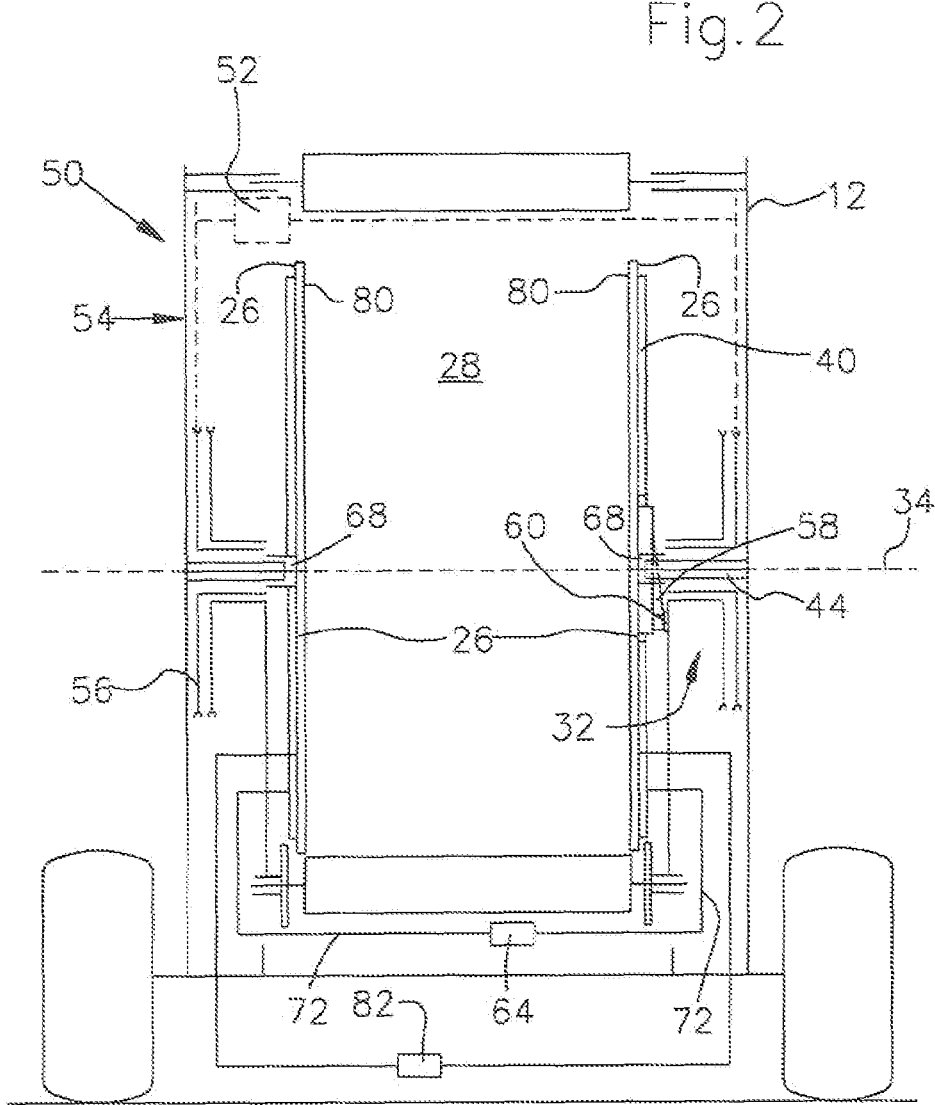

BALER WITH MOISTURE SENSING ARRANGEMENT

FIELD OF THE INVENTION

The invention concerns a baler with a frame and a baling chamber for the production of a bale of harvested crop, that is provided with two walls located opposite each other and is connected at least one sensor for the detection of the moisture content of the bale arranged on the wall of the baling chamber interacting with the bale formed of harvested crop and connected with an evaluation arrangement.

BACKGROUND OF THE INVENTION

A stationary extrusion press is described in DE 23 03 109 A, that is arranged for pressing of cereal crop into briquettes. The extrusion press is equipped with a moisture measuring arrangement that encloses an extrusion guide containing the extrusion produced that can detect the moisture contents by means not described in any further detail, for example, by measurement of the dielectric constant. Accordingly, the measurement of the moisture content is performed downstream of the press itself.

A mobile baler is proposed by DE 32 32 746 A with a moisture measuring arrangement. The latter contains moisture measurement electrodes attached to hold-downs. The hold-downs are located above a take-up drum and are pressed against the harvested crop by springs.

EP 1 029 440 A describes an agricultural large round baler with a moisture measuring arrangement not specified in any further detail that is located on the underside of a bale produced in the baling chamber.

DE 102 04 941 A, that is regarded as forming the class, proposes a movile large round baler with a capacitor type sensor arranged on a side wall of the baling chamber for the detection of the moisture content of the bale.

As a rule, such mobile balers are equipped with moisture sensors for purposes of mapping the yield or for the control of the automatic dispensing of preservatives. The attachment of the sensors has been found to be problematical. The arrangement according to DE 32 32 746 A has the disadvantage that the harvested crop just taken up is examined before baling, this crop still being relatively loose. The result of the measurement is affected largely by the air between the stalks of the harvested crop and is therefore not representative of the actual crop. The moisture sensors according to EP 1 029 440 A and DE 102 04 941 A in each case interact with only relatively small areas of the bale. The small measurement areas result in locally varying crop moisture values and varying mechanical characteristics of the harvested crop that results in varying distances between the harvested crop and the sensors and hence sharply varying measurement values that are subject to large errors. Therefore, the known sensors have shown not to be useful in actual applications.

The problem to be solved then is that of providing a baler with a moisture sensing arrangement which results in obtaining moisture information which is accurate relative to substantially all of the crop contained in a bale.

SUMMARY OF THE INVENTION

According to the present invention, there is provided an improved moisture measurement arrangement for a baler.

In the present invention, a stationary or mobile baler is provided which includes a frame, that supports and/or forms a baling chamber with walls, particularly side walls that extend vertically and in a direction of travel during operation. The invention proposes that the sensor that is connected to an evaluation arrangement for the determination of the moisture content of the bale extend over the entire wall of the baling chamber. For this purpose, at least one of the walls is electrically insulated relative to the frame and preferably also to the remaining components of the baling chamber and is connected to the evaluation arrangement. The entire wall itself is electrically conductive and is then used as a sensor for the determination of the moisture content of the harvested crop. It should be noted that the wall need not necessarily provide the mechanical stability needed to support the bale. It may instead be a thin element (for example, a foil) that is attached to the inside of an element facing the bale which is sufficiently rigid. The latter may be electrically insulated or it is metallic and connected to the frame so as to be electrically conductive and an insulating layer is provided between the wall and the element or the element is insulated relative to the frame. The critical thing is that the wall and thereby the sensor is adjacent the entire bale.

In this way, the result is a relatively large surface of the sensor that interacts with the entire bale. Thereby an average value of the moisture content of the entire material of the bale is determined, that is affected to an essentially smaller degree by local variations of the moisture content of the harvested crop and changing mechanical characteristics of the harvested crop, compared to the relatively small known sensors. Thereby the result is greater accuracy of the measured value.

In a preferred embodiment, a sensor connected to the evaluation arrangement extends over the entire second wall of the baling chamber. For this purpose, the second wall can be insulated relative to the frame and connected to the evaluation arrangement. Alternatively, it would be conceivable to connect the second wall electrically to the frame and to use the first wall as the first sensor and to connect the second wall to the frame as a second sensor connected to the evaluation arrangement.

At its other walls, the baling chamber is enclosed preferably by electrically insulating elements consisting, for example, of plastic, rubber or other electrically insulating materials or provided with electrically insulating surfaces, these other walls that are in addition to the walls used as sensors, that is remaining enclosures (that is, in a large round baler in the radial direction), so that these do not create any undesired short circuit between the sensors. Alternatively, or in addition, elements able to conduct electricity could be used at the aforementioned locations as long as these are insulated at least with respect to the frame.

The evaluation arrangement can measure an electrical characteristic of the bale, for example, the electrical resistance between the two sensors or between the sensor and the frame. The measured electrical resistance is a measure of the moisture content of the bale. Alternatively, or in addition, the capacitance between the two sensors or between on sensor and the frame can be measured which is also a measure of the moisture content of the bale. In the case of a measurement of the capacitance, the sensor or sensors could be provided with an electrically insulating coating that prevents a short circuit between the sensors in case of a high surface moisture content of the harvested crop of the bale.

The invention can be applied particularly to large round balers with a variable or fixed size baling chamber. But it can also be applied to a rectangular baler where the wall used as a sensor may be a side wall or it may be an upper wall or a lower wall. Obviously, the invention can also be applied to balers with fixed walls that cannot be adjusted.

In large round balers with walls that can be adjusted in a sideways direction, the measurement of the moisture is preferably performed at a location at which the walls converge, since an optimal contact between the bale and the walls is possible there.

BRIEF DESCRIPTION OF THE DRAWINGS

The drawings show an embodiment of the invention that shall be described in greater detail in the following.

FIG. 1 is a schematic left side view of a large round baler, constructed in accordance with the present invention, shown in a closed position.

FIG. 2 is a rear view of the baler illustrated in FIG. 1.

DESCRIPTION OF THE PREFERRED EMBODIMENT

The following description must be prefaced by the fact that the directions cited are made with reference to a forward direction of travel during operation of a baler 10, which is to the left as viewed in FIG. 1. The baler 10 shown in FIG. 1 includes a frame 12, a chassis 14, a towbar 16, a take-up arrangement 18, rolls 20, baling elements 22, a tension arrangement 24, side walls 26, a baling chamber 28, pivoting components 30 and a compressing arrangement 32 (see FIG. 2).

In the embodiment shown, the baling chamber 28 of the baler 10 is variable in its size, but the baler may also be equipped with a baling chamber that is fixed in size. Harvested crop taken up from the ground is formed into a cylindrical bale in the baling chamber 28, with the bale pressing against the side walls 26 with its end faces.

The frame 12 can be seen particularly well in FIG. 2, and is configured as a weldment and/or a bolted assembly to which all components of the baler 10 are fastened, the frame 12 being supported on the chassis 14 and can be connected, by the towbar 16, to a towing vehicle, not shown. Among other items, the frame 12 carries sheathing components, not shown, several of the rolls 20, the side walls 26 and the pivoting components 30. The frame 12 largely encloses the region surrounded by the side walls 26 and the baling elements 22.

The chassis 14 consists, in a manner not detailed any further, of an axle and wheels upon which the frame 12 rests. The towbar 16 is attached to the front side of the frame 12 either rigidly or in a manner permitting it to be adjustable in height.

The take-up arrangement 18 is configured in the usual manner as a so-called pick-up and is connected to the frame 12 so as to be adjustable in its height. The take-up arrangement 18 can be followed downstream by a cutting arrangement, not shown, also known in itself. The take-up arrangement 18 takes up crop deposited on the ground and passes the crop along to the baling chamber 28 over a possibly present cutting arrangement, and the crop is formed into a cylindrical bale in the baling chamber.

Several of the rolls 20 are supported in bearings, free to rotate, in the stationary frame 12 and are identified as 20'. Another roll 20" can be adjusted against the force of a spring 24, so that the baling elements 22 can comply with the increasing diameter of the bale. Again, other pulleys 20''' can be pivoted about a pivot axis 34 on the pivoting components 30. All rolls 20 extend parallel to each other and are sufficiently wide and arranged in such a way that the baling elements 22 can circulate over them and cooperate with the side walls 26 to enclose the baling chamber 28. In addition to the rolls 20, rolls 36 are also provided, which are located above an opening 38 into the baling chamber 28, and operate as so-called starter rolls during the beginning of the process of forming the bale and upon which a part of the weight of the formed bale can be supported.

The baling elements 22 are configured as belts running parallel to each other that essentially cover the width of the baling chamber 28. In place of the configuration of belts, the baling elements could be configured as a bar chain conveyor or as a wide belt, as is also known in practice. The baling elements 22 are endless and are brought into rotation by their contact in a friction lock with at least one driven roll 20'. In the area of the inlet opening 38, the baling elements 22 form a bridge that deflects inward under an increasing amount of harvested crop to form a loop that surrounds the forming bale. The baling elements 22 are kept under tension since they are conducted over one of the rolls 20" whose position can be varied.

The tensioning arrangement 24 is formed in a known manner by the roll 20" that is conducted over an arm, slide or the like, not shown, against the force of a spring 24 and maintains a loop of the baling elements 22 under tension at all times.

In the view according to FIG. 1, the side walls 26 take on the shape of a "D", where the rear end region, at the right in FIG. 1, forms an arc, that generally follows the line of the circumference of the finished bale, that is, the shape of a circular arc. Basically, the side walls 26 are configured as on-piece components, that is, they are not divided along an approximately central, generally vertical plane, as is the case in conventional balers; they may, however, be composed of several parts. FIG. 2 reveals that the side walls 26 are spaced at a not inconsiderable distance from the frame 12 and thereby can be deflected outward as is described in the following. The side walls 26 are configured so as to be stiff in bending by means of reinforcing struts 40, where the reinforcing struts 40 can be bolted or welded in place. According to the illustrations of FIGS. 1 and 2, the reinforcing struts 40 extend nearly in a star shape pattern relative to the pivot axis 34 and extend tangentially to it with little spacing, and finally converge inwardly more or less vertically on each other. On the basis of this course, they enclose a four-sided chamber 42, in this embodiment. In their forward end region, the side walls 26 are generally connected rigidly to the frame 12 by means of electrically insulating fastening rails 70; however a small pivoting movement through a few degrees in the outward direction is possible starting from a position, according to FIG. 2, due to the fact that either the side walls 26 are formed in the connection region, for example, from resilient sheet metal or are secured by means of a resilient connection, for example, attached to a resilient flange or retained by spring-loaded screws. The connection of the side walls 26 to the frame 12 occurs generally along a more or less vertical line at the front end of the baling chamber 28. In the area of the pivot axis 34, each side wall 26 is guided on an axis 44 by an electrically insulating bushing 68, with the axis 44 being rigidly fastened to the frame 12 and being used simultaneously as a pivot axis for the pivoting components 30.

In contrast to the embodiment described above, the connection to the side walls 26 can also occur long an upper line that is more or less horizontal or inclined slightly, so that the side walls 26 diverge and open downward when the bale is ejected.

The baling chamber 28 can be varied in its size and is bordered at the beginning, that is, when the baling chamber 28 is empty, by an approximately triangular cylindrical space between the take-up arrangement 18 and the baling elements 22 and bordered at the sides by the side walls 26. As the supply of harvested crop increases, the baling chamber 28 widens and finally occupies a cross section that follows the shape of the side walls 26 I the rear region.

In this embodiment, the pivoting components 30 are provided on each side of the baler 10 with one or more arm or arms 46 extending radially to the pivot axis 34, and one or more transverse component or components 48 attached to the radially outer ends of the arm or arms and extending transverse to the arm or arms. A roll 20''' is provided at each end of each transverse component 48. The pivoting components 30 are arranged with the radially inner end of each arm 46, free to pivot, about the axis 44. The position of the arms 46 is controlled by a drive 50 that includes a motor 52 and a belt drive gear box 54 or any other pivoting drive, for each pivoting component 30. The pivoting components 30 could also be driven synchronously by common pivoting drives or they could be connected rigidly with each other, so that only a single pivoting drive is required. The motor 52 can be braked in each of its positions and retains the arms 46 in corresponding stationary positions. The output wheels 56 associated with each of the belt drive gear boxes 54 are supported in bearings concentric to each other and to the axis 44 and are each connected to a pivoting component 30, fixed against rotation. The pivoting components 30 are controlled in such a way that the forward pivoting component 30 is repositioned during the bale forming phase, in order to assist in the forming of the core of a bale, and that the forward pivoting component 30 occupies a lower position while the bale is being formed and that both pivoting components 30 assume an upper position when the bale is being ejected.

Aside from the insulating fastening rails 70, the baler described so far is described essentially in all its details in EP 1 264 531 A, whose contents is incorporated into this application.

The compression arrangement 32 includes an upwardly inclined or rising surface 58 and a follower 60 and is used for, and during, the ejection of the bale to reduce the pressure, and thereby the friction, of the side walls 26 on the end faces of the bale, so that the bale can be unloaded more easily form the baling chamber 28.

The rising surface 58 is located on a circular arc that is concentric to the pivot axis 34, the rising surface being fastened to the outer surface of both side walls 26, where it would also be sufficient to provide only one rising surface, that is on just one of the side walls 26. In the present embodiment, the rising surface 58 is formed by a bent steel part that is bolted to the side walls 26 within the chamber 42 and is uniformly inclined upward or rising.

The follower 60 is provided on the side of the arm 46 of the rear pivoting component 30 facing the longitudinal center plane of the baler 10 and is configured as a sliding surface. In order to minimize frictionl, the sliding surfaces are greased; alternatively, the follower 60 can also be configured as a wheel, pulley, ball or similar rolling component. The follower 60 is arranged in such a way that it follows a circular path upon a rotation of the pivoting component 30 about the pivot axis 34 and moves along the rising surface 58. Preferably, the follower 60 is in contact with the rising surface 58 at all times.

The follower 60 rests upon the highest rise of the rising surface 58 and the pivoting components 30 are in their lower end position—see FIG. 1—and the bale can be produced.

When the pivoting components 30 are brought into their upper position, counterclockwise from that shown in FIG. 1, in which the bale can be released from the baling chamber 28, the follower is moved to the lowest point of the rising surface 58. The difference between the highest and lowest point may, for example, amount to 20 to 50 mm.

As soon as the bale has been formed in the baling chamber 28, the pivoting component 30 is raised whereupon the side walls 26 move outward on the basis of the pressure existing in the baling chamber 28 which emanated from the compressed harvested crop. As a result, the friction between the inside of the side walls 26 and the end faces of the bale is reduced and the bale falls out of the baling chamber 28 onto the ground of the field under the force of gravity, that is, it rolls across the floor of the baling chamber 28 and a roll-out arrangement 80 that follows the floor to the rear. As soon as the bale has left the baling chamber 28 and the baler 10 has been moved along through such a distance that the pivoting components 30 can be lowered again, a pivoting movement of the pivoting components 30 is performed in the opposite direction, so that the follower is moved onto the highest point of the rising surface e58 and thereby forces the side walls 26 inward.

For the purpose of yield mapping, the baler 10 is equipped with a position sensor 62 in the form of a GPS satellite antenna. It is connected with an evaluation arrangement 64 that, in turn, is connected electronically by lines 72 to sensors 80 arranged on an entire surface of at least one of the side walls 26, that are independent of each other. As described above, the side walls 26 are insulted electrically with respect to the frame 12 and the remaining elements bordering the baling chamber 28 (rolls 20 and baling elements 22, that for their part, are provided with insulating surfaces). The evaluation arrangement 64 detects the electrical resistance between the side walls 26, which resistance being a measure of moisture content of the bale just formed. For this purpose, a direct current voltage is applied from a voltage source 82 which could for example be connected to a power source on the towing vehicle, and the current density of the current flowing through one or both lines is detected. The electrical capacitance between the side walls 26 can also be measured by the evaluation arrangement, that also depends on the moisture content of the bale. For this purpose, for example, an alternating current voltage is applied to the side wall 26 and the current density of the current flowing through one or both lines 72 is detected. Both measurements can also be combined (that is, taken simultaneously or one after another) in order to detect the surface moisture content by a measurement of the direct current resistance and the volume moisture content of the bale by measurement of the alternating current resistance. Any other desired measurement process is possible (see DE 199 34 881 A and the state of the art cited there). In capacitive measurements, the side walls 26 may be insulated relative to the baling chamber 28. Due to the relatively large measurement surface of the side walls 26, an average moisture content of the entire bale is detected.

A bus line (for example, a CAN bus) connects the position sensor 62 with the evaluation arrangement 64. The evaluation arrangement 64 and the position sensor 62 could also be located on the towing vehicle, where corresponding software considers the special offset between the position sensor 62 and the take-up arrangement 18. During operation, the evaluation arrangement 64 prepares a moisture map in which the moisture content of the bale as detected is recorded and geo-referenced.

During the process of taking-up the harvested crop from the field, a bale is gradually formed in the baling chamber 28. Once the bale has reached the desired size, which is detected by a sensor, the moisture of the bale is measured and recorded as described above. Alternatively, the moisture is measured and recorded continuously during the forming of the bale. Immediately following the formation of a given bale, the motor 52 of the drive 50 is activated by a control arrangement, as described above. Thereby the pivoting components 30 rotate in the counterclockwise direction, as seen in FIG. 1, and the side walls 26 move outward. At first, the bale rests on the rolls 20''' (with the intervening sections of the baling elements 22). The forward roll 20''' (shown in FIG. 1) rolls along the underside of the bale and then along the rear side, until it comes to a stop at its upper side. At that point, the side walls 26 are separated from the end faces of the bale and the latter is ejected since it is no longer supported at its bottom side.

Having described the preferred embodiment, it will become apparent that various modifications can be made without departing from the scope of the invention as defined in the accompanying claims.

The invention claimed is:

1. In a large round baler including a frame supporting a baling chamber for the production of a bale of harvested crop, with the baling chamber including opposite first and second walls having respective inner first and second surfaces disposed for engaging a bale formed between them, and a moisture detection sensor being arranged on said first surface of said first wall, which interacts with the bale formed of harvest crop and said sensor is connected to an evaluation arrangement, the improvement comprising: said moisture detection sensor extending over an entire inner surface of said first wall of said baling chamber and said evaluation arrangement determines a moisture content of said bale by measuring an electrical resistance between the first and second walls or measuring an electrical capacitance between the first and second walls.

2. The baler, as defined in claim 1, wherein said first and second walls extend vertically and in a direction of forward travel during operation of said baler.

3. The baler, as defined in claim 1, and further including a second moisture detection sensor extending over an entire area of said second surface of said second wall, and being connected to said evaluation arrangement.

4. The baler, as defined in claim 1, wherein said first wall is coupled to said frame so as to be electrically insulated from said frame.

5. The baler, as defined in claim 2, wherein said baling chamber being one of fixed or variable.

6. The baler, as defined in claim 5, wherein said first and second side walls are mounted for sideways movement relative to each other; and said moisture detection sensor and said evaluation arrangement being operable for performing a measurement of moisture when said walls are moved together so as to be separated by a minimum distance.

* * * * *